US008416100B2

(12) United States Patent
Azoulai

(10) Patent No.: US 8,416,100 B2
(45) Date of Patent: Apr. 9, 2013

(54) METHOD AND DEVICE FOR MONITORING A HORIZONTAL POSITION OF AN AIRCRAFT ROLLING ON THE GROUND

(75) Inventor: Laurent Azoulai, Mondonville (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 12/599,640

(22) PCT Filed: May 5, 2008

(86) PCT No.: PCT/FR2008/000630
§ 371 (c)(1),
(2), (4) Date: Nov. 10, 2009

(87) PCT Pub. No.: WO2008/152231
PCT Pub. Date: Dec. 18, 2008

(65) Prior Publication Data
US 2010/0219986 A1 Sep. 2, 2010

(30) Foreign Application Priority Data
May 11, 2007 (FR) ..................................... 07 03376

(51) Int. Cl.
*G08B 21/00* (2006.01)
*G08B 23/00* (2006.01)
*G01C 21/00* (2006.01)
*G01S 19/00* (2010.01)
*G05D 1/00* (2006.01)

(52) U.S. Cl.
USPC ........ 340/945; 340/970; 340/977; 342/357.2; 701/4

(58) Field of Classification Search .................. 340/945, 340/357.22; 342/357.2; 701/4
See application file for complete search history.

(56) References Cited

U.S. PATENT DOCUMENTS

| 5,646,857 A | 7/1997 | McBurney |
| 5,969,672 A | 10/1999 | Brenner |

(Continued)

FOREIGN PATENT DOCUMENTS

| FR | 2 708 349 | 2/1995 |
| FR | 2 888 643 | 7/2005 |
| FR | 2 869 123 | 10/2005 |

OTHER PUBLICATIONS

International Search Report dated Dec. 5, 2008 w/ English translation.

(Continued)

*Primary Examiner* — George Bugg
*Assistant Examiner* — Jack K Wang
(74) *Attorney, Agent, or Firm* — Dickinson Wright PLLC

(57) ABSTRACT

A method and device performs onboard monitoring of a horizontal position of a taxiing aircraft, in which the monitoring of the horizontal position is based on separately determined height differences of the aircraft. A predetermined threshold value is compared with a first height difference calculated using repetitively determined first current height positions received by an onboard positioning device over a first duration. The predetermined threshold value is also compared with calculated second height differences calculated from two successively measured second current height positions determined by an altimeter over a second duration that is less than or equal to the first duration. A warning signal, signaling a problem with the reliability of the monitored horizontal position of the taxiing aircraft, is emitted in the event none of the second height differences is greater than the threshold value, and the first height difference is greater than the threshold value.

8 Claims, 3 Drawing Sheets

U.S. PATENT DOCUMENTS

| | | | |
|---|---|---|---|
| 6,522,298 B1 * | 2/2003 | Burgett et al. | 342/462 |
| 6,690,295 B1 * | 2/2004 | De Boer | 340/951 |
| 7,605,688 B1 * | 10/2009 | Seah | 340/425.5 |
| 2004/0186635 A1 * | 9/2004 | Manfred | 701/4 |
| 2005/0151681 A1 * | 7/2005 | Conner et al. | 342/36 |
| 2005/0234609 A1 | 10/2005 | Villaume | |
| 2009/0128405 A1 | 5/2009 | Fetzmann | |

OTHER PUBLICATIONS

Written Opinion of the International Searching Authority with English translation.

* cited by examiner

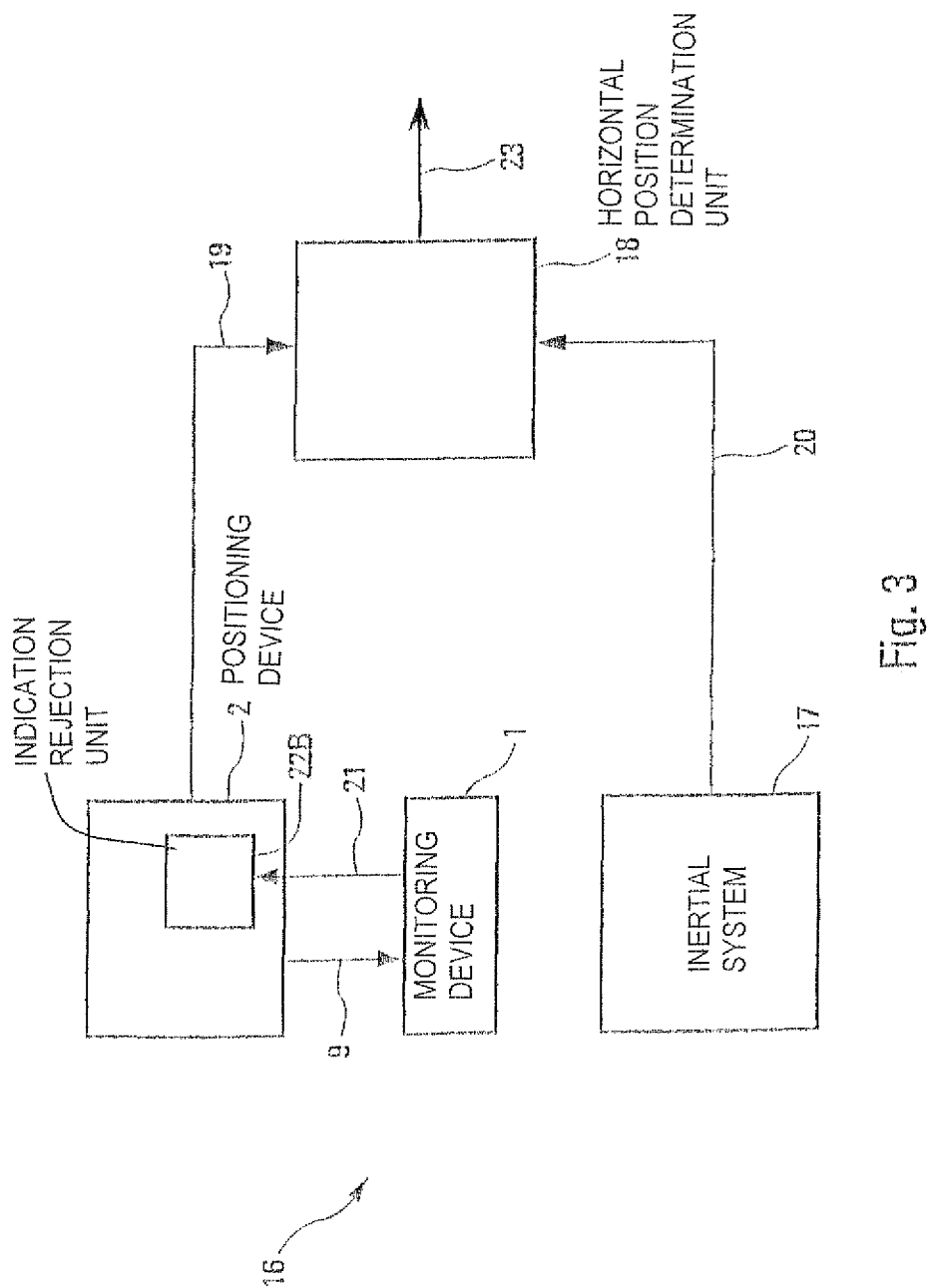

METHOD AND DEVICE FOR MONITORING A HORIZONTAL POSITION OF AN AIRCRAFT ROLLING ON THE GROUND

FIELD OF THE INVENTION

The present invention relates to a method and a device for monitoring an indication of the horizontal position of an aircraft, in particular a transport aircraft, that is taxiing on the ground during airport navigation.

BACKGROUND OF THE INVENTION

In the context of the present invention, said indication of horizontal position is part, with an indication of height, of an indication of position that corresponds to the current position of the aircraft. This indication of position is determined repeatedly by an onboard positioning device, using information that is detected at repeated moments by an associated receiver which cooperates with a conventional satellite positioning system, such as GPS, GALILEO, GLONASS, WARS, EGNOS systems, etc.

Although not exclusively, this horizontal position indication is more particularly used by a ground navigation aid system (see in particular FR-2 869 123) or a ground navigation/guidance system which are fitted on an aircraft and which are designed to improve the safety of the aircraft when taxiing on an airfield, in particular with the aim of avoiding collisions on the ground, runway incursions or navigation errors.

Yet the position indications coming from such an onboard positioning device are subject to errors that are caused by interfering phenomena such as a multipath phenomenon, essentially during a situation that is static or with low aircraft speed.

A multipath is a common phenomenon in the field of radio navigation and radio communication, which involves radiofrequency signals and which is a transient phenomenon depending on many factors.

Specifically, the signal transmitted by a marker or a satellite in the direction of a mobile user may be reflected by obstacles that it might encounter, such as buildings, the ground, or other vehicles. The power of the reflected signal and its phase depend on the distance from the reflector in relation to the onboard receiver antenna, on its hardware components, and on the power of the initial signal. Furthermore, the conditions for appearance and the impact that multipaths may have on a user depend strongly on the speed. For example, for a mobile user, knowing that the obstacle is static and that the satellite is moving, there are high probabilities that the reflected signals will hardly affect the position error, in any event over a short period. Conversely, when the user and the receiver are static, as in the airport navigation considered in the present invention, the position error may be significant.

With regard to airport navigation systems, A-SMGCS (Advanced Surface Movement Guidance and Control System) control and guidance systems or OANS (Onboard Airport Navigation System) systems are known. These airport navigation systems mostly use radio navigation means based on GNSS (Global Navigation Satellite System) satellite technology, such as GPS, GLONASS, or in the future GALILEO, and their SEAS (Satellite Based Augmentation System) augmentations, such as WAAS or EGNOS, or GEAS (Ground Based Augmentation System) augmentation.

It is known that to correct the errors inherent in GNSS satellite positioning systems, and in particular their sensitivity to multipaths (or to masking) or alternatively to the loss of a satellite, airport navigation systems rely on an estimation technique that uses an independent sensor to fill in the holes in the GNSS measurements. This estimation technique often uses inertial systems, speed sensors (tachometers) or distance sensors (odometer) for identifying the path of the aircraft during a temporary absence of GNSS measurements.

Specifically, when the aircraft is static or taxiing at low speed, and in the event of masking or multipath, the onboard GNSS receiver may be subject to unacceptable measurement errors that lead to jumps in position of several meters. Such measurement errors can be seen, for example, on a navigation screen showing the aircraft on a map of the airport. However, the use of the aforementioned estimation technique in such a situation is difficult because when the aircraft is static the path, distance or speed measurements are impossible. It is possible to use the fact that the observed inertial speed is zero, but inertial systems are subject to errors in speed, including in static mode, which are inherent in these systems. When the aircraft is moving at low speed, the use of an odometer or a tachometer is no longer appropriate as they are imprecise and above all are of low resolution which, during small movements, may lead the computer to error by not detecting the movements. With respect to the speeds worked out by the positioning device using a GNSS positioning system, these are also sensitive, though to a lesser degree than the position, to multipaths.

In addition, when the aircraft is moving at a steady speed it may be subject to multipaths or masking which may cause it to suffer jumps or losses of position. Combination with an independent system such as an odometer, a tachometer, or an inertial system makes it possible to solve numerous problems. However, for some dynamics, taking account of the errors inherent in these systems, position errors may occur because the combination does not always make it possible to distinguish those due to a movement from those due to a measurement error linked with a multipath.

It should be noted that document FR 2 888 643 discloses a method and a device for determining the position on the ground of an aircraft on an airport.

SUMMARY OF THE INVENTION

The present invention relates to a method for monitoring an indication of horizontal position of an aircraft that is taxiing on the ground during an airport navigation, which monitoring method makes it possible to alleviate the aforementioned problems, and in particular to detect an error in the indication of horizontal position due to the aforementioned interference phenomena and in particular to a multipath phenomenon. Said indication of horizontal position is part, with a first indication of height, of an indication of position that corresponds to the current position of the aircraft. This indication of position is determined in a repetitive manner by an onboard positioning device using information that is detected at repeated moments, separated by a first duration, by an associated receiver that cooperates with a satellite positioning system, for example a GNSS system.

To this end, according to the invention, said method is notable in that the following sequence of operations is carried out automatically and repeatedly:

a) second indications of height are measured repeatedly using at least one onboard altimeter for a second duration which is less than or equal to said first duration;

b) using these second indications of height measured in step a), a plurality of second height differences is calculated which correspond to the respective differences, each time, between two second height indications that have been measured successively;

c) each of the second height differences thus calculated is compared with a predetermined threshold value which depends at least on characteristics of said altimeter;

d) a first height difference is calculated which corresponds to the difference between said first height indication, which is associated with the indication of horizontal position monitored and a first height indication determined just previously by said positioning device;

e) this first difference is compared with said threshold value; and f) if none of said second height differences is greater than said threshold value, but said first height difference is greater than said threshold value, a warning signal is emitted which signals a problem with the reliability of said indication of horizontal position.

Thus, thanks to the invention, in order to detect an error in an indication of horizontal position (determined by a positioning device, for example a GNSS positioning device), measurements are used which are carried out by an independent element, namely an altimeter (for example, a radio altimeter or a barometric altimeter). The (independent) information obtained using this altimeter is therefore independent of the interference phenomena considered in the present invention (and in particular are not subject to multipaths), for which the indication of position (for example of the GNSS type) may be erroneous.

According to the invention, to be able to detect a problem with the reliability of the indication of horizontal position, the height indication which is transmitted simultaneously with this indication of horizontal position is analyzed by the onboard positioning device. In this case, a height difference which appears between two height indications successively measured by the positioning device is due:

either to an effective height difference at ground level. This effective height difference is then also detected from measurements carried out using the altimeter;

or to errors due to interference phenomena such as multipaths. In this case, the measurements carried out using the altimeter do not detect any height difference.

In a preferred embodiment, said threshold value is greater than at least three times a measurement noise of said altimeter and is less than a predetermined value.

The present invention also relates to a device for monitoring an indication of horizontal position (such as aforementioned) of an aircraft, in particular of a transport aircraft, which is taxiing on the ground during an airport navigation.

According to the invention, said monitoring device is onboard and comprises:

at least one altimeter for measuring, repeatedly, second indications of height for a second duration which is less than or equal to the aforementioned first duration;

first means for calculating, using these second height indications measured by said altimeter, a plurality of second height differences which correspond to the respective differences, each time, between two second height indications that have been measured successively;

second means for comparing each of the second height differences calculated by said first means with a predetermined threshold value which depends at least on characteristics of said altimeter;

third means for calculating a first height difference which corresponds to the difference between said first height indication, which is associated with the indication of horizontal position monitored and a first height indication determined just previously by said positioning device;

fourth means for comparing this first difference calculated by said third means with said threshold value; and fifth means for emitting a warning signal which signals a problem with the reliability of said indication of horizontal position, if none of said second height differences is greater than said threshold value, while said first height difference is greater than said threshold value.

The present invention also relates to a system for locating an aircraft which is taxiing on the ground during an airport navigation of the type comprising:

a positioning device that determines, repeatedly, an indication of position which comprises an indication of horizontal position and a height indication, using information detected at repeated moments by an associated receiver which cooperates with a satellite positioning system;

an inertial system that generates inertial data of the aircraft; and a first element that determines a current horizontal position of the aircraft using the indication of horizontal position determined by said positioning device and using inertial data generated by said inertial system.

According to the invention, this location system is notable in that it additionally comprises:

a monitoring device such as that previously described which monitors the indication of horizontal position determined by said positioning device; and a second element which prevents said first element from using said indication of horizontal position in order to determine the current horizontal position of the aircraft in the case in which said monitoring device has emitted a warning signal.

In this case, in a first embodiment, said second element is integrated in said first element and is formed so as to reject an indication of horizontal position received from said positioning device in the case in which said monitoring device has emitted a warning signal.

In addition, in a second embodiment, said second element is integrated in said positioning device and is formed so as to prevent the transmission of an indication of horizontal position to said first element in the case in which said monitoring device has emitted a warning signal.

BRIEF DESCRIPTION OF THE DRAWINGS

The figures of the appended drawing will allow a better understanding of how the invention may be produced. On these figures identical reference numbers denote like elements.

FIGS. 2 and 3 schematically illustrate two different aircraft location systems which each comprise a monitoring device according to the invention.

DETAILED DESCRIPTION OF THE INVENTION

Figure 1:
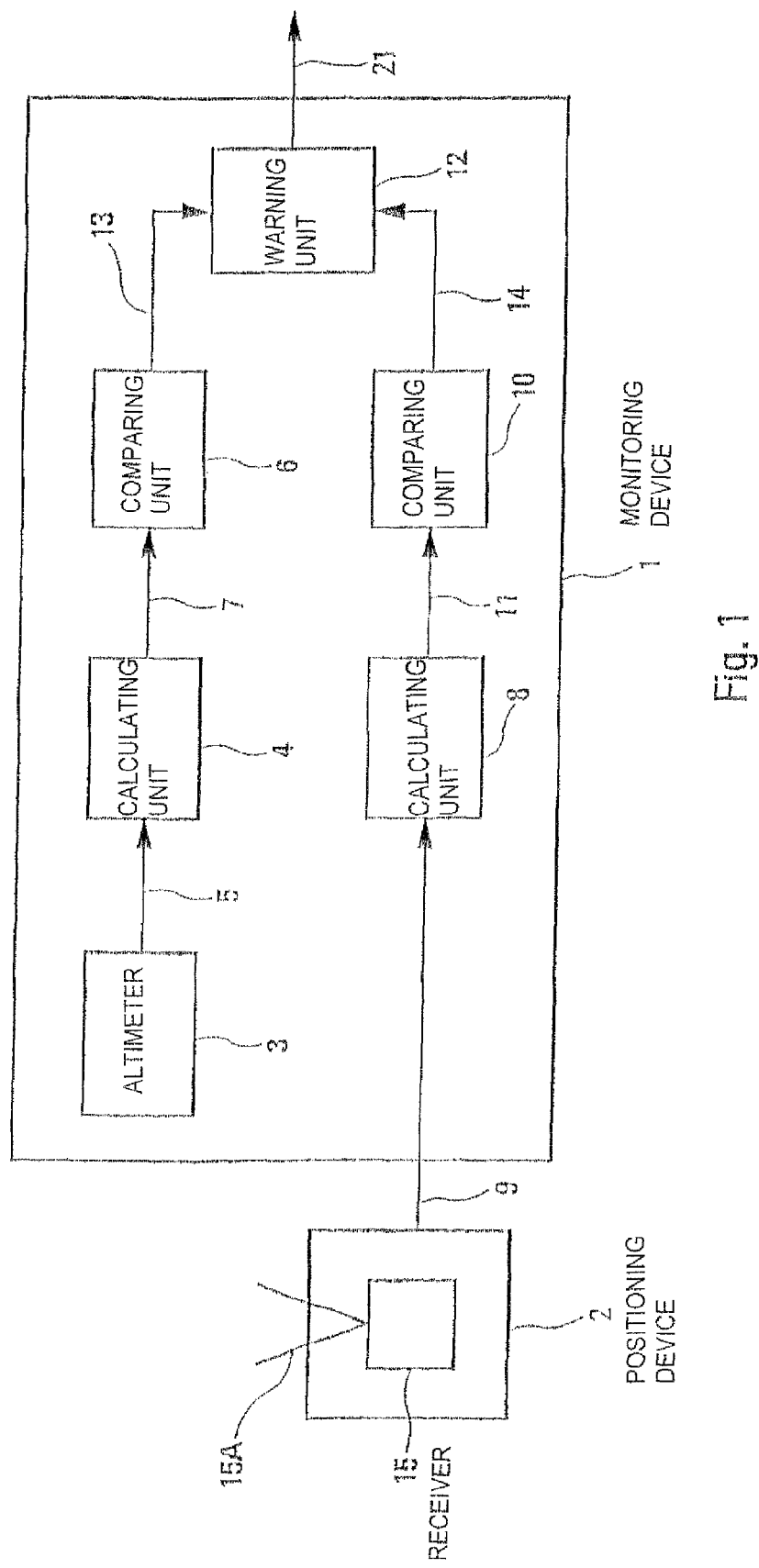
FIG. 1 is the overview diagram of a monitoring device according to the invention.

The device 1 according to the invention, and schematically represented in FIG. 1, is intended to monitor an indication of horizontal position of an aircraft, in particular of a civil transport aircraft that is taxiing on the ground during an airport navigation.

In the context of the present invention, said indication of horizontal position is part, with an indication of height (hereafter called "first height indication"), of an indication of position that corresponds to the current position of the aircraft. This indication of position is determined repeatedly by an onboard positioning device 2, using information that is detected at repeated moments (separated by a first duration, for example a second) by an associated conventional receiver 15 which comprises an antenna 15A and which cooperates with a conventional satellite positioning system, such as GPS, GALILEO, GLONASS, WAAS, EGNOS systems, etc.

According to the invention, said device 1 is onboard the aircraft and comprises:

- at least one altimeter 3 for measuring, repeatedly, second indications of height for a second duration (for example 50 ms) which is less than or equal to said first duration;
- means 4 which are connected by means of a connection 5 to said altimeter 3 and which are formed so as to calculate, using these second height indications measured by said altimeter 3, a plurality of second height differences which correspond to the respective differences, each time, between two second height indications that have been measured successively by the altimeter 3;
- means 6 which are connected by means of a connection 7 to said means 4 and which are formed so as to compare each of the second height differences (calculated by said means 4) with a predetermined threshold value K (which depends at least on characteristics of said altimeter 3);
- means 8 which are connected by means of a connection 9 to said positioning device 2 and which are formed so as to calculate a first height difference which corresponds to the difference between said first height indication, which is associated with the indication of horizontal position monitored and a first height indication determined just previously (i.e. at the step or at the moment of the preceding calculation) by said positioning device 2;
- means 10 which are connected by means of a connection 11 to said means 8 and which are formed so as to compare this first difference (calculated by said means 8) with said threshold value K; and
- means 12 which are connected by means of connections 13 and 14 respectively to said means 6 and 10 and which are formed so as to emit a warning signal which signals a problem with the reliability of said monitored indication of horizontal position, if none of said second height differences is greater than said threshold value K, while said first height difference is greater than said threshold value K.

These means 12 may comprise elements for emitting an audible warning signal and/or elements for emitting a visual warning signal, for example in the form of a light signal or a particular symbol which is displayed on a display screen of the aircraft cockpit. Said means may also emit a warning signal by means of a connection 21 to various systems (not shown) of the aircraft.

Thus the monitoring device 1 according to the invention uses measurements carried out by an autonomous element, namely an altimeter 3, to detect an error in an indication of horizontal position (determined by a positioning device 2, for example a GNSS device). The autonomous information obtained using this altimeter 3 is thus independent of the interference phenomena considered in the present invention, for which the indication of position (and therefore the indication of horizontal position) generated by the positioning device 2 may be erroneous. In particular, this information is not subject to multipaths. This altimeter 3 may be:

- a conventional radio altimeter which uses the reflection of radio waves on the ground with a view to determining the height relative to the ground; or
- a conventional barometric altimeter which directly determines the altitude as a function of the measured barometric pressure.

The aforementioned processes implemented by the device 1 are of course carried out for each indication of horizontal position generated (repeatedly) by the positioning device 2.

Consequently, according to the invention, in order to be able to detect a problem with the reliability of an indication of horizontal position transmitted by the onboard positioning device 2, the monitoring device 1 analyzes the height indication that is transmitted simultaneously with this indication of horizontal position by said positioning device 2. In this case, a difference in height (greater than the threshold value K) appearing between two height indications successively measured by the positioning device 2 is due:

- either to an effective height difference at ground level. This effective height difference is then also detected from measurements carried out using the altimeter 3, some of the second height differences then being greater than the threshold value K;
- or to errors due to interference phenomena such as multipaths. In this case, the measurements carried out using the altimeter 3 do not detect any height difference, as no second height difference is greater than the threshold value K.

In a preferred embodiment of the invention, said threshold value K is greater than at least three times the measurement noise of said altimeter 3, which is known and is less than a predetermined value, namely the potential measurement of the altitude difference generated by an aircraft taxiing at 80 knots on a 10% slope. It will be noted that the value of the threshold K may be confirmed by tests and may depend on intrinsic characteristics of the altimeter 3.

A particular exemplary embodiment is presented hereafter for which the indication of position is generated at a frequency of 1 hertz by the positioning device 2 and is provided with a delay of 200 milliseconds. As for the second height indications, these are generated by the altimeter 3 which is in this case a radio altimeter at a frequency of 20 hertz and they are provided with a delay of 100 milliseconds. In this case, the measurements made by the altimeter 3 are observed over a sliding window of 200 milliseconds.

If a time T of output of said first height indication (from the positioning device 2) is considered, the corresponding position indication has been formulated, at the earliest, 200 milliseconds previously, namely at T-200. If the height measurements (second height indications) provided by the altimeter 3 at T-200, T-150, T-100, T-50, and respectively defined by HT-200, HT-150, HT-100 and HT-50, are considered, the following second height differences are obtained:

$$\Delta H150 = HT\text{-}200 - HT\text{-}150$$

$$\Delta H100 = HT\text{-}150 - HT\text{-}100$$

$$\Delta H50 = HT\text{-}100 - HT\text{-}50$$

If these second height differences $\Delta H150$, $\Delta H100$ and $\Delta H50$ are all less than or equal to the threshold value K, this means that the aircraft does not make any significant vertical movement. Hence, the altitude (or the height) provided by the positioning device 2 in nominal conditions, without a fault, and in the absence of interference phenomena such as a multipath phenomenon, should not be affected by the height variation measured by the altimeter 3 in the above conditions.

If the altitude (or height) measurements provided by the positioning device 2 at T-200 and T-1200, hT-200 and ht-1200 respectively, are considered, the following first height difference is obtained:

$$\Delta ht1200 = \Delta ht\text{-}200 - \Delta ht\text{-}1200$$

Hence if the altimeter 3 has not measured variations in height and if the height difference Δht1200 is greater than or equal to the value of the threshold K as defined above, this means that one or more measurements made by the receiver 15 associated with the positioning device 2, enabling the position indication at T-200 to be calculated, have been affected by an interference phenomenon, such as a multipath phenomenon for example. This indication of position at T-200 generated by the positioning device 2 is therefore erroneous and is to be rejected. In such a situation, the means 12 of the device 1 emit a warning signal with this meaning.

It will be noted that if the aircraft is static and/or undergoing slight movements, but is still on the ground, it is difficult to determine whether a GNSS position incorporated in an overall hybrid GNSS/inertia/odometer/tachometer solution is valid. This is because filters combine the GNSS/inertia/odometer/tachometer data so as to be less sensitive to GNSS errors by observing the aircraft velocity vector. However, this GNSS-independent velocity measurement is erroneous due either to measurement noise of the (inertial) sensor or to the low resolution of the sensor (odometer, tachometer). The monitoring device 1 according to the invention therefore makes it possible, in a particular application such as this, to exclude the GNSS errors that might contaminate the combination/navigation filter, the latter not being able to determine from the inertial, odometric or tachometric information whether the GNSS information is contaminated with an error or reflects the actual movement of the aircraft.

Figure 2:
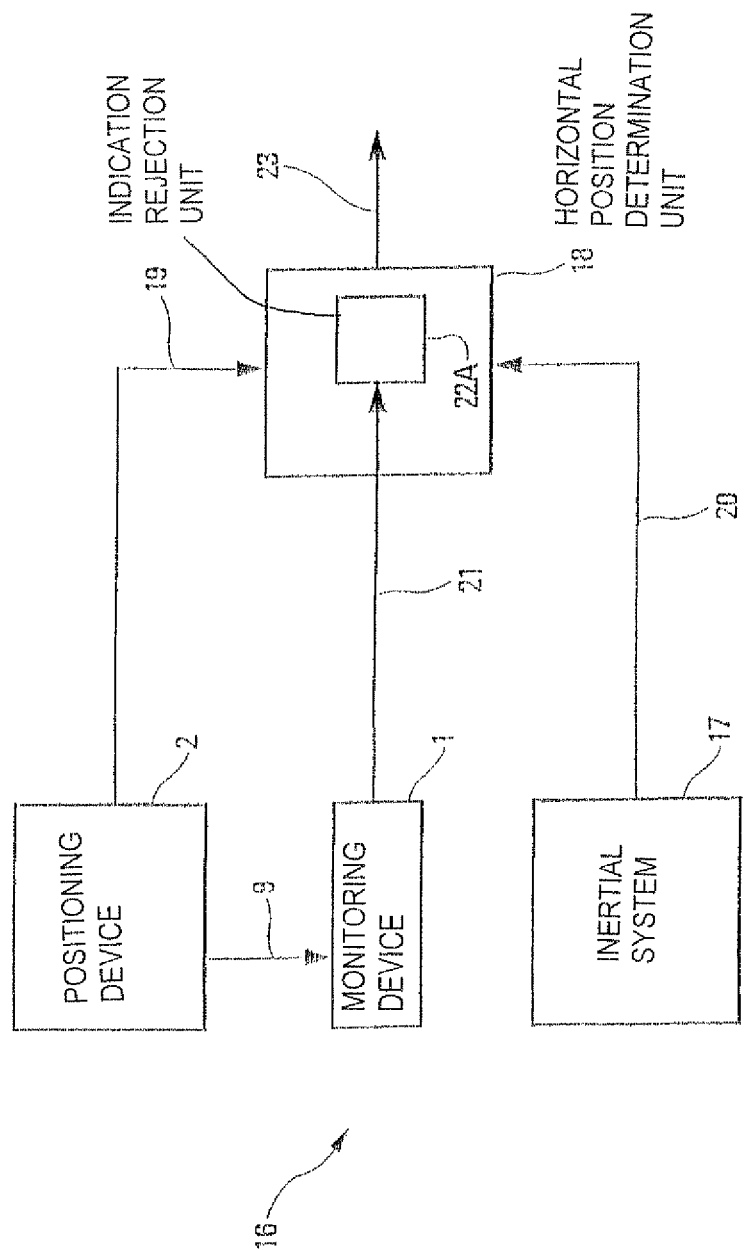

Furthermore, in a preferred application of the invention, the monitoring device 1 according to the invention is part of a location system 16 which is represented according to two different embodiments in FIGS. 2 and 3.

This location system 16 makes it possible to locate an aircraft that is taxiing on the ground during an airport navigation. Hence this location system 16 may be part of an airport navigation system (not shown) such as a system aiding navigation on the ground or a ground navigation/guidance system, which is mounted on the aircraft and which is intended to improve the safety of the aircraft when taxiing on an airfield, in particular with the aim of avoiding collisions on the ground, runway incursions or navigation errors.

With regard to airport navigation systems, A-SMGCS (Advanced Surface Movement Guidance and Control System) control and guidance systems and OANS (Onboard Aircraft Navigation System) systems are known in particular.

As shown in FIGS. 2 and 3, said location system comprises:
- a positioning device 2, such as previously mentioned, that determines, repeatedly, an indication of position which comprises an indication of horizontal position and a height indication, using information detected at repeated moments by an integrated receiver (equipped with an antenna 15A) which cooperates with a satellite positioning system, for example a GNSS system;
- a conventional inertial system 17 that generates, in a conventional manner, inertial data of the aircraft; and
- an element 18 which is connected by means of connections 19 and 20 respectively to said positioning device 2 and to said inertial system 17 and which determines in a conventional manner a current horizontal position (combined type) of the aircraft using the indication of horizontal position determined by said positioning device 2 and using inertial data generated by said inertial system 17.

Said element 18 may be a calculation means that is either independent or integrated in an aircraft computer or system, in particular in said inertial system 17. This element 18 transmits the indication of horizontal position enabling the aircraft to be located by means of a connection 23 with user systems, and in particular with a system aiding ground navigation (not shown).

According to the invention, this location system 16 in addition comprises:
- a monitoring device 1 according to the invention which is connected by means of the connection 9 to said positioning device 2 and which monitors the indication of horizontal position determined by this positioning device 2; and
- an element 22A, 22B which is connected by means of the connection 21 to said monitoring device 1 and which prevents said element 18 from using an indication of horizontal position in order to determine the current horizontal position of the aircraft in the case in which said monitoring device 1 has emitted (via the connection 21) a warning signal indicating a problem with the reliability of this indication of horizontal position.

In the embodiment of FIG. 2, said element 22A is directly integrated in said element 18 and is formed so as to reject an indication of horizontal position received from said positioning device 2 when the monitoring device 1 emits a warning signal.

In addition, in the embodiment of FIG. 3, said element 22B is integrated in the positioning device 2 and is formed so as to prevent the transmission by the latter of an indication of horizontal position to the element 18 when the monitoring device 1 emits a warning signal.

The invention claimed is:

1. A method for onboard monitoring of a horizontal position of an aircraft taxiing on the ground during an airport navigation, comprising the steps of:
determining said horizontal position in part by determining first current height positions of the aircraft, wherein said first current height positions are repetitively determined over a first duration by an onboard positioning device that receives aircraft position information from an associated receiver that cooperates with a satellite positioning system, wherein the following steps are carried out automatically and repeatedly by an onboard monitoring device:
a) repeatedly measuring second current height positions using at least one onboard altimeter for a second duration which is less than or equal to said first duration;
b) calculating, using the second current height positions measured in step a), a plurality of second height differences which correspond to the respective differences between two successively measured second current height positions;
c) comparing each of the calculated second height differences with a predetermined threshold value which depends at least on characteristics of said altimeter;
d) calculating a first height difference which corresponds to a difference between said repetitively determined first current height positions determined by said onboard positioning device;
e) comparing the first height difference with said threshold value; and
f) emitting a warning signal which signals a problem with the reliability of said monitored horizontal position of said taxiing aircraft, in the event none of said second height differences is greater than said threshold value, but said first height difference is greater than said threshold value.

2. The method as claimed in claim 1, wherein said threshold value is greater than at least three times a measurement noise of said altimeter and is less than a predetermined value.

3. The method as claimed in claim 1, wherein said altimeter is a radio altimeter.

4. The method as claimed in claim 1, wherein said altimeter is a barometric altimeter.

5. An onboard monitoring system for monitoring a horizontal position of an aircraft taxiing on the ground during an airport navigation, comprising:
an onboard positioning device configured to repetitively determine said horizontal position, including current height positions of the aircraft, which are repetitively determined over a first duration, with the onboard positioning device further configured to receive aircraft position information from an associated receiver that cooperates with a satellite positioning system,
an onboard monitoring device, linked to the onboard positioning device, wherein the onboard monitoring device comprises:
at least one altimeter configured to repeatedly measure second current height positions over a second duration which is less than or equal to the first duration;
second height difference calculating means, linked to the altimeter, and configured to calculate, using the second current height positions measured by said altimeter, a plurality of second height differences, which correspond to the respective differences between two successively measured second current height positions;
second comparing means, linked to the second height difference calculating means, and configured to compare each of the second height differences calculated by said first second height differ means with a predetermined threshold value which depends at least on characteristics of said altimeter;
first height difference calculating means, linked to the onboard positioning device, and configured to calculate a first height difference, which corresponds to a difference between said repetitively determined first current height positions determined by said onboard positioning device;
first comparing means, linked to said first height difference calculating means and configured to compare the first height difference calculated by said first height difference calculating means with said threshold value; and
warning means, linked to said first and second comparing means, and configured to emit a warning signal which signals a problem with the reliability of said monitored horizontal position of said taxiing aircraft, in the event that none of said second height differences is greater than said threshold value, but said first height difference is greater than said threshold value.

6. An onboard aircraft location system for locating an aircraft taxiing on the ground during an airport navigation, said system comprising:
a positioning device configured to repeatedly determine aircraft position as a horizontal position indication and a height indication, using information detected at repeated moments by an associated receiver which cooperates with a satellite positioning system;
an inertial system that generates inertial data of the aircraft;
a position element, linked to the positioning device and the inertial system, which determines a current horizontal position of the aircraft using the horizontal position indication determined by said positioning device and using the inertial data generated by said inertial system;
a monitoring device, linked to the onboard positioning device, which monitors the horizontal position determined by said positioning device, wherein the onboard monitoring device comprises:
at least one altimeter configured to repeatedly measure second current height positions over a second duration which is less than or equal to the first duration,
second height difference calculating means, linked to the altimeter, and configured to calculate, using the second current height positions measured by said altimeter, a plurality of second height differences, which correspond to the respective differences between two successively measured second current height positions,
second comparing means, linked to the second height difference calculating means, and configured to compare each of the second height differences calculated by said first second height differ means with a predetermined threshold value which depends at least on characteristics of said altimeter,
first height difference calculating means, linked to the onboard positioning device, and configured to calculate a first height difference, which corresponds to a difference between said repetitively determined first current height positions determined by said onboard positioning device,
first comparing means, linked to said first height difference calculating means and configured to compare the first height difference calculated by said first height difference calculating means with said threshold value, and
warning means, linked to said first and second comparing means, and configured to emit a warning signal, which signals a problem with the reliability of said monitored horizontal position of said taxiing aircraft, in the event that none of said second height differences is greater than said threshold value, but said first height difference is greater than said threshold value; and
a prevention element, linked to the monitoring device, and configured to prevent said position element from using said horizontal position indication to determine the current horizontal position of the aircraft in the event said monitoring device emits a warning signal.

7. The onboard aircraft location system as claimed in claim 6, wherein said prevention element is integrated in said position element and is configured to reject the horizontal position indication received from said positioning device in the event said monitoring device emits a warning signal.

8. The onboard aircraft location system as claimed in claim 6, wherein said prevention is integrated in said positioning device and is configured to prevent transmission of the horizontal position indication to said position element in the event said monitoring device emits a warning signal.

* * * * *